United States Patent [19]

Watanabe et al.

[11] Patent Number: 5,262,497
[45] Date of Patent: Nov. 16, 1993

[54] METHOD OF PREVENTING POLYMER SCALE DEPOSITION AND POLYMER SCALE PREVENTIVE LIQUID USED THEREIN

[75] Inventors: Mikio Watanabe; Masahiro Usuki, both of Kamisu; Susumu Ueno, Hazaki, all of Japan

[73] Assignee: Shin-Etsu Chemical Co., Ltd., Tokyo, Japan

[21] Appl. No.: 894,646

[22] Filed: Jun. 5, 1992

Related U.S. Application Data

[62] Division of Ser. No. 705,644, May 24, 1991, Pat. No. 5,147,455.

[30] Foreign Application Priority Data

May 25, 1990 [JP] Japan .................................. 2-135679

[51] Int. Cl.$^5$ .......................... C08F 2/00; C08F 14/06; C08F 20/0644
[52] U.S. Cl. ........................................ 526/62; 526/213; 526/225; 526/317.1; 422/131
[58] Field of Search ............. 526/62, 213, 225, 317.1; 422/131

[56] References Cited

U.S. PATENT DOCUMENTS 4,539,230 9/1985 Shimizu et al. ...................... 526/62

Primary Examiner—Joseph L. Schofer
Assistant Examiner—Tom Weber
Attorney, Agent, or Firm—Oblon, Spivak, McClelland, Maier & Neustadt

[57] ABSTRACT

Polymer scale deposition from a polymerization medium in which a monomer having an ethylenic double bond is polymerized, is prevented by conducting the polymerization in a polymerization vessel having a coating by applying a liquid comprising (A) an organic compound containing at least one member selected from the group consisting of a sulfonic acid group and a carboxylic acid group and having a molecular weight of 1000 or less and (B) a water-insoluble compound having an absorption band in the visible light range of 540 to 750 nm, the compounds (A) and (B) having been dissolved or dispersed in (C) an ester-based organic solvent, and having a pH of 3 or less; to the inner wall surfaces of said polymerization vessel. Polymer scale can be effectively prevented and polymeric products are barely colored.

10 Claims, No Drawings

METHOD OF PREVENTING POLYMER SCALE DEPOSITION AND POLYMER SCALE PREVENTIVE LIQUID USED THEREIN

This is a division of application Ser. No. 07/705,644, filed on May 24, 1991 now U.S. Pat. No. 5,147,455.

BACKGROUND OF THE INVENTION

1. Field of the Invention

The present invention relates to a method of preventing polymer scale deposition in polymerization of a monomer having an ethylenic double bond, and a polymer scale preventive liquid used in the method.

2. Description of the Prior Art

In processes of preparing polymers by polymerizing a monomer in a polymerization vessel, the problem that polymer deposits on the inner wall surface and so forth in the form of scale, is known. The deposition of the polymer scale on the inner wall results in disadvantages that the yield of the polymer and the cooling capacity of the polymerization vessel are lowered; that the polymer scale may peel and mix into manufactured polymer, thereby impairing the quality of the manufactured polymer; and that removal of such polymer scale is laborious and hence time-consuming. Further, since the polymer scale contains unreacted monomer and operators may be exposed thereto, which may cause physical disorders in the operators.

Heretofore, to prevent polymer scale deposition on the inner wall surface and so forth of a polymerization vessel, methods in which suitable substances are coated on the inner wall surface, etc. as a scale preventive agent, are known. Disclosed as scale preventive agents are, for example, a dye or pigment (Japanese Patent Publication (KOKOKU) Nos. 45-30835(1970) and 52-24953(1977)), an aromatic amine compound (Japanese Pre-examination Patent Publication (KOKAI) No. 51-50887(1976)) and a reaction product of a phenolic compound and an aromatic aldehyde (Japanese Pre-examination Patent Publication (KOKAI) No. 5-54317(1980)).

These methods can fairly effectively prevent the deposition of polymer scale in the polymerization of a vinyl halide monomer such as vinyl chloride or a monomer mixture mainly comprised of such a monomer.

In the meantime, vinyl chloride polymers obtained by polymerization are required to have a good whiteness; for example, they are required to have an L value according to the Hunter's color difference equation, which is described below, of 70 or more.

The prior art polymer scale preventive agents generally include a great number of colored substances as exemplified typically by the dyes and pigments described in Japanese Patent Publication (KOKOKU) No. 45-30835(1970) or 52-24953(1977), the aromatic amine compounds described in Japanese Pre-examination Patent Publication (KOKAI) No. 51-50887(1976), and the reaction products of a phenolic compound and an aromatic aldehyde described in Japanese Pre-examination Patent Publication (KOKAI) No. 55-54317(1980). If the coating comprising such a colored polymer scale preventive agent is dissolved or peeled to be mixed into a manufactured polymer, causing contamination of the produced polymer, a problem may arise that the produced polymer become colored and its quality is seriously lowered. That is, according to measurement of the lightness L in the Hunter's equation described in JIS Z 8730 (1980), the L may be measured to be 65 or less.

The scale-preventing effect achieved by the prior art methods varies depending on polymerization conditions such as the kind of monomers, the type of polymerization, the kind of a polymerization catalyst, and the material of the inner wall of a polymerization vessel; it is difficult to prevent the scale deposition effectively and certainly. Specifically, when a polymerization catalyst with a strong oxidative effect such as potassium persulfate, ammonium persulfate, acetylcyclohexylsulfonyl peroxide and di-2-ethoxyethyl peroxydicarbonate is used, the scale preventive agent forming the coating may be oxidized, so that the scale preventing effect is impaired. In the case of polymerization vessels with inner wall made of stainless steel or other steels, polymer scale deposition is liable to occur as compared with vessels lined with glass. Emulsion polymerization is liable to form polymer scale deposition as compared with suspension polymerization.

Moreover, where the monomer to be polymerized is styrene, α-methylstyrene, acrylates, acrylonitrile or the like, the monomer has such a strong dissolving power against the coatings formed by the above scale prevention methods that the coating may be partly or completely dissolved away, resulting that deposition of polymer scale on the inner wall surfaces and so forth of a polymerization vessel cannot be effectively prevented. In this instance, if a stainless steel polymerization vessel as mentioned above is used, polymer scale is seriously liable to deposit on the inner wall surfaces, etc.

SUMMARY OF THE INVENTION

An object of the present invention is to provide a method capable of effectively preventing polymer scale deposition without any problems as mentioned above, and particularly with no fear that product polymers may be colored, and a polymer scale preventing liquid used in the method.

Thus, the present invention provides, as a means of achieving the above object, a method of preventing polymer scale deposition in polymerization of a monomer having an ethylenic double bond in a polymerization vessel, which comprises the step of carrying out said polymerization in a polymerization vessel having a coating formed by applying a liquid comprising:

(A) an organic compound containing at least one group selected from the group consisting of a sulfonic group (—$SO_3H$) and a carboxyl group which each may form a salt, and has a molecular weight of 1,000 or less, and (B) a compound which is insoluble in water and has an absorption band in a visible light range of 540 to 750 nm, the compounds (A) and (B) having been dissolved or dispersed in (C) an ester-based organic solvent, and having a pH of 3 or less, to the inner wall surfaces of said polymerization vessel and then drying the applied liquid.

The present invention also provides a polymer scale preventive liquid for use in polymerization of a monomer having an ethylenic double bond, comprising:

(A) an organic compound containing at least one group selected from the group consisting of a sulfonic group (—$SO_3H$) and a carboxyl group which each may form a salt, and has a molecular weight of 1,000 or less, and (B) a compound which is insoluble in water and has an absorption band in a visible light range of 540 to 750 nm, the compounds (A) and (B) having been dissolved or dispersed in (C) an ester-based organic solvent, and having a pH of 3 or less.

According to the present invention, the coating obtained by applying and drying the liquid has a good durability and is insoluble in the monomer having an ethylenic double bond or water; hence the coating is by no means dissolved or peeled into a polymerization system. Consequently, according to the present invention, there is no fear that resulting polymers may be colored, so that polymers having a high whiteness with an L value of 70 or more can be produced.

Further, polymer scale deposition can be effectively and certainly prevented, independent of the polymerization conditions such as the kind of monomers, type of polymerization, the material constituting the inner wall of polymerization vessels, etc. That is, in any of polymerizing monomers by suspension polymerization, emulsion polymerization, bulk polymerization, solution polymerization or gas phase polymerization, or in the case of polymerizing in a stainless steel or glass-lined polymerization vessel, or in the case of using a polymerization catalyst having a strong oxidative effect, polymer scale deposition can be effectively prevented. Therefore, the operation of removing polymer scale is not required to be conducted every polymerization run; hence productivity is markedly improved in addition to stable production of polymers of high quality.

DETAILED DESCRIPTION OF PREFERRED EMBODIMENTS

(A) Organic Compound Containing a Sulfon Group or a Carboxyl Group

Component (A) is an organic compound containing at least one group selected from a sulfonic acid group ($-SO_3H$) and carboxyl group and has a molecular weight of 1,000 or less.

Such organic compounds include, for example, organic acids such as terephthalic acid, 1,12-dodecanedicarboxylic acid, 1-dodecanedisulfonic acid, benzoic acid, lauric acid, sulfanilic acid, p-styrenesulfonic acid, propionic acid, salicylic acid, copperphthalocyanine tetrasulfonic acid, glycine hydrochloride, urocanic acid, L-ascorbic acid, D-isoascorbic acid, chlorogenic acid, caffeinic acid, p-toluene sulfonic acid, sorbic acid and $\beta$-naphthoquinone-4-sulfonic acid. These organic acids may be present in the form of salts of alkali metals such as sodium, potassium or lithium or ammonium salts. These may be used singly or in combination of two or more.

Preferred as the component (A) are terephthalic acid, sulfanilic acid, salicylic acid, glycine hydrochloride, L-ascorbic acid, D-isoascorbic acid, chlorgenic acid, caffeinic acid, P-toluene sulfonic acid, sorbic acid and alkali metal salts of these organic acids.

Since the organic compounds have a molecular weight of 1,000 or less, preferable 500 or less, they can be readily dissolved in the solvent (C) described later; therefore it is possible to obtain a uniform liquid for preventing polymer scale deposition by dissolving the organic compound in the solvent (C). Since such a uniform liquid is applied to the inner wall surfaces, etc. and dried, uniform coatings can be formed and sufficient effects of preventing deposition can be attained.

In contrast to the above, an organic compound having a molecular weight of more than 1,000, even if it has a sulfon group or a carboxyl group, is hardly soluble in ester-based organic solvents and liable to form sedimentation; therefore, it results in a uneven state when preparation of solution is attempted. Consequently, if a liquid obtained by dissolving such a compound having a larger molecular weight in a solvent, is applied to the inner wall surfaces and dried, uneven coatings are formed and therefore sufficient effects of preventing deposition can not be obtained.

(B) Compound Having an Absorption Band in a Visible Light Region

Component (B) is insoluble in water and has an absorption band within the visible light region of from 540 to 750 nm, preferably from 550 to 660 nm. The value of log k (where k represents the molar extinction coefficient of said absorption band) is preferably 3 or more, and more preferably 4 or more.

Examples of such compounds include dyes such as C.I.Solvent Violet 21 and 27; C.I.Solvent Blue 2, 11, 12, 25, 35, 36, 55 and 73; C.I.Solvent Green 3; C.I.Solvent Brown 3, 5 and 20; and C.I.Solvent Black 3, 5, 7, 23 and 123, which may be used singly or in combination of two or more. Among them, preferred are C.I.Solvent Blue 2, 11 and 36; C.I.Solvent Green 3; C.I.Solvent Brown 3, 5 and 20; and C.I.Solvent Black 3, 5 and 7.

Component (B) is insoluble in water, and therefore serves to make the coatings formed by applying and drying the present scale preventive liquid, insoluble in water.

Incidentally, it has been discovered from our experiences that a compound having an absorption band in the visible light region of 540 to 750 nm like the component (B) has a function of preventing polymer scale deposition when used as a coating on the inner wall surfaces of a polymerization vessel.

(C) Ester-Based Organic Solvent

The ester-based organic solvent used as the component (C) means an organic solvent containing an organic acid ester as a main component, preferably containing 30% by weight or more of the organic acid ester. It may contain for example water, alcohols, ketones, ethers or the like in an amount of 70% by weight or less, for instance.

The organic acid ester includes, for example, methyl formate, ethyl formate, butyl formate, amyl formate, methyl acetate, ethyl acetate, propyl acetate, isopropyl acetate, butyl acetate, sec-butyl acetate, isobutyl acetate, amyl acetate, isoamyl acetate, methylamyl acetate, 2-ethylbutyl acetate, methyl propionate, ethyl propionate, butyl propionate, isobutyl propionate, amyl propionate, methyl butyrate, ethyl butyrate, butyl butyrate, isoamyl butyrate, methyl lactate, ethyl lactate, butyl lactate, diethyl oxalate and dibutyl oxalate. Among the esters, preferred are methyl formate, ethyl formate, methyl acetate, ethyl acetate, butyl acetate, methyl propionate and ethyl propionate. These esters may be used singly or in combination of two or more.

The mixed solvents containing other solvents, include, for example, mixed solvents of such an ester with an alcohol such as methanol, ethanol, n-propyl alcohol or the like, with a ketone such as acetone, methyl ethyl ketone, or the like, an ether solvent such as diethyl ether, 1,4-dioxane or the like, or with water.

Preparation of a Scale Preventive Liquid

The scale preventive liquid can be prepared by dissolving or dispersing the component (A) and the component (B) in the component (C), the solvent. The total concentration of the component (A) and the component(B) is not limited as long as a desired coating weight, i.e., a desired total weight of the components (A) and (B) per unit area, can be obtained. Normally, it may be in the range of from about 0.01 to about 30% by weight, preferably from about 0.05 to about 15% by weight. The component (B) is normally contained in an amount of from 0.1 to 500 parts by weight, preferably from 1 to 200 parts by weight, per 100 parts by weights of the component (A) If the content of the component (B) is too small relatively to the component (A), the coating may be dissolved and removed into water when washed with water, even if the scale preventive liquid was dried after application. If the amount of the component (B) is too large relatively to that of the component (A), the coating may be dissolved and removed by a monomer having an extremely strong dissolving power such as styrene, α-methylstyene, acrylonitrile or the like during polymerization.

The polymer scale preventive liquid of the present invention needs to have a pH of 3 or less, preferably 2 or less. For this reason, if a liquid prepared has a pH of more than 3, its pH needs to be controlled by addition of a pH adjuster. A pH of less than 3 of the scale preventive liquid makes the coating formed insoluble in the monomer having an ethylenic double bond. Insolubility of the coating in said monomer or water increases with decrease in the pH of the liquid. pH adjusters which may be added to the liquid includes, for example, inorganic acids such as sulfuric acid, hydrochloric acid, phosphoric acid, nitric acid, perchloric acid and the like.

Where a polymer scale preventive liquid has a pH of 3 or less due to the action of the sulfonic acid group or carboxylic group contained in the component (A), no pH adjuster is required to be added, but if the pH of the liquid is to be further decreased, e.g., to 2 or less, a pH adjuster may be added as necessary.

Formation of the Coating

The polymer scale preventive liquid is applied to the inner walls of a polymerization vessel and then dried sufficiently, followed by washing with water if necessary, to form the coating. The drying may be carried out at a temperature from room temperature to 100° C., for instance.

The polymer scale preventive liquid is preferably applied to not only the inner wall surface of a polymerization vessel but also other parts with which the monomer comes into contact during polymerization to form the coating on such parts. For example, it is preferred to apply the coating solution to a stirring shaft, stirring blades, condensers, headers, search coil, bolts, nuts, etc. to form the coating thereon. Particularly, on stirring blades, stirring shaft and baffles, the coating should be formed by application of the coating solution.

More preferably, for formation of the coating, the polymer scale preventive liquid is applied to portions with which monomers does not come into contact during polymerization but on which polymer scale may deposit, for example, portions of recovery system for unreacted monomer, such as inner surfaces, etc. of equipment and pipes of the recovery system. Specifically, such portions include the inner surfaces of monomer distillation columns, condensers, monomer stock tanks and valves.

The method of applying the coating solution is not particularly limited, and includes, for example, the brush coating, spray coating, the method of filing the polymerization vessel with the coating solution followed by withdrawal thereof, and automatic coating methods as disclosed in Japanese Pre-examination Patent Publication (KOKAI) Nos. 57-61001(1982) and 55-36288(1980), and Japanese Patent Publication (KOHYO) Nos. 56-501116(1981) and 56-501117(1981), and Japanese Pre-examination Publication (KOKAI) No. 59-11303(1984), etc.

The method of drying wet coated surfaces provided by application of the polymer scale preventive liquid, is not limited, either. Following methods can be used. That is, a method in which, after the solution is applied, hot air with an suitable elevated temperature is blown to the coated surface, and a method in which the inner wall surface of a polymerization vessel and the surfaces of other parts to be coated are previously heated to from 30° to 80° C., and the polymer scale preventive liquid is directly applied to the heated inner wall surfaces, etc. After dried, the coated surfaces are washed with water if necessary.

The coating thus obtained normally has a coating weight of preferably 0.001 g/m$^2$ or more, and more preferably from 0.01 to 2 g/m$^2$. If the coating weight is less than 0.001 g/m$^2$, it is difficult to attain the polymer scale preventing effect all over the coated surfaces.

The coating operation may be conducted every one to ten-odd batches of polymerization. The formed coating has good durability and retains the scale-preventing action; therefore the coating operation is not necessarily performed every batch of polymerization. Thus, productivity is improved.

Polymerization

After the formation of the coating on the inner wall surfaces of a polymerization vessel, and preferably other parts with which monomer may come into contact during polymerization by coating treatment, polymerization is carried out in accordance with conventional procedures. That is, a monomer having an ethylenically double bond, a polymerization initiator, and optionally a polymerization medium such as water, etc., a suspending agent, a solid dispersing agent, a dispersing agent such as nonionic or anionic surfactants are charged into the polymerization vessel, followed by carrying out polymerization according to conventional methods.

The monomer having an ethylenically double bond to which the method of this invention can be applied may include, for example, vinyl halides such as vinyl chloride; vinyl esters such as vinyl acetate and vinyl propionate; acrylic acid, methacrylic acid, and esters or salts thereof; maleic acid, fumaric acid, and esters or anhydrides thereof; and diene monomers such as butadiene, chloroprene and isoprene; as well as styrene, acrylonitrile, halogenated vinylidenes, and vinyl ethers.

There are no particular limitations on the type of polymerization to which the method of this invention can be applied. The present invention is effective in any type of polymerization such as suspension polymerization, emulsion polymerization, solution polymerization, bulk polymerization, and gas phase polymerization. Particularly, the present method is more suitable to polymerizations in an aqueous medium such as suspension or emulsion polymerization.

In the following, general conditions are described on each type of polymerization.

In the case of suspension or emulsion polymerization, first, water and a dispersing agent are charged into a polymerization vessel, and thereafter a polymerization initiator is charged. Subsequently, the inside of the polymerization vessel is evacuated to a pressure of from 0.1 to 760 mmHg, and a monomer is then charged (whereupon the pressure inside the polymerization vessel usually becomes from 0.5 to 30 kgf/cm$^2$.G). Thereafter, polymerization is carried out at a temperature of from 30° to 150° C. During the polymerization, one or more of water, a dispersing agent and a polymerization initiator may be added, if necessary. Reaction temperature during the polymerization is different depending on the kind of monomer to be polymerized. For example, in the case of polymerizing vinyl chloride, polymerization is carried out at 30° to 80° C.; in the case of polymerizing styrene, polymerization is carried out at 50° to 150° C. The polymerization may be judged to be completed when the pressure inside the polymerization vessel falls to from 0 to 7 kgf/cm$^2$.G or when cooling water which passes through a jacket provided around the polymerization vessel indicates almost the same temperature at the inlet where it is charged and at the outlet where it is discharged (i.e., when liberation of heat due to polymerization reaction has subsided). The water, dispersing agent and polymerization initiator to be charged for polymerization are used in amounts of 20 to 500 parts by weight, 0.01 to 30 parts by weight, and 0.01 to 5 parts by weight, respectively, per 100 parts by weight of the monomer.

In the case of solution polymerization, an organic solvent such as toluene, xylene and pyridine is used as the polymerization medium in place of water. The dispersing agent is optionally used. The other conditions are generally the same as those described for suspension and emulsion polymerizations.

In the case of bulk polymerization, after the inside of a polymerization vessel is evacuated to a pressure of from about 0.01 mmHg to about 760 mmHg, a monomer and a polymerization initiator are charged into the polymerization vessel, and then polymerization is carried out at a temperature of from −10° C. to 250° C. Specific methods of the bulk polymerization includes, for example, liquid bulk polymerization and gas phase polymerization for vinyl chloride.

Application of the method of preventing polymer scale deposition of the present invention to polymerization, makes it possible to prevent polymer scale from depositing, independent of materials constituting the inner wall, etc. of a polymerization vessel. For example, this method can prevent deposition of polymer scale even in the case polymerization is carried out in a polymerization vessel made of a steel including stainless steel or lined with glass.

Any additive materials that have been conventionally added in a polymerization system can be used without any limitation. More specifically, the method of this invention can effectively prevent polymers from depositing, even in polymerization systems containing the following additives: for example, polymerization catalysts such as t-butyl peroxyneodecanoate, bis(2-ethylhexyl) peroxydicarbonate, 3,5,5-trimethylhexanoyl peroxide, α-cumyl peroxyneodecanoate, cumene hydroperoxide, cyclohexanone peroxide, t-butyl peroxypivalate, bis(2-ethylhexyl) peroxydicarbonate, benzoyl peroxide, lauroyl peroxide, 2,4-dichlorobenzoyl peroxide, diisopropyl peroxydicarbonate, α,α'-azobisisobutyronitrile, α,α'-azobis-2,4-dimethylvaleronitrile, potassium peroxodisulfate, ammonium peroxodisulfate, p-menthane hydroperoxide; suspension agents comprised of natural or synthetic polymeric compounds such as partially saponified polyvinyl alcohols, polyacrylic acids, vinyl acetate/maleic anhydride copolymer, cellulose derivatives such as hydroxypropylmethyl cellulose, and gelatin; solid dispersing agents such as calcium phosphate and hydroxyapatite; nonionic emulsifying agents such as sorbitan monolaurate, sorbitan trioleate and polyoxyethylene alkyl ether; anionic emulsifying agents such as sodium lauryl sulfate, sodium alkylbenzenesulfonates such as sodium dodecylbenzenesulfonate and sodium dioctylsulfosuccinate; fillers such as calcium carbonate and titanium oxide; stabilizers such as tribasic lead sulfate, calcium stearate, dibutyltin dilaurate and dioctyltin mercaptide; lubricants such as rice wax, stearic acid and cetyl alcohol; plasticizers such as DOP and DBP; chain transfer agents such as mercaptans such as t-dodecyl mercaptan, and trichloroethylene; and pH adjusters.

Although the mechanism by which polymer scale deposition is prevented according to the present invention, it is presumed that the coating comprising the component (A) and the component (B) has an action of inhibiting the abnormal adsorption of monomers having an ethylenic double bond present in the polymerization system, its initial condensates and a resulting polymer on the inner wall surfaces of the polymerization vessel.

EXAMPLES

The method of the present invention is now described by way of working examples and comparative examples. In each of the tables below, Experiment Nos. marked with * indicate comparative examples, and the other Experiment Nos., working examples of the present invention.

EXAMPLE 1

Polymerization was carried out in the following manner using a stainless steel polymerization vessel with an inner capacity of 1,000 liters and having a stirrer.

In each experiment, first, a component (A) and a component (B) were dissolved in a solvent (C) so as to give a total concentration of 1% by weight as given in Table 1 to prepare a polymer scale preventive liquid. The pH of the solution was measured, and when necessary a pH adjuster was added. The polymer scale preventive liquid was applied to the inner wall and other parts with which monomers come into contact during polymerization, such as the stirring shaft, stirring blades and baffles. Then, the wet coated surfaces were dried by heating at 50° C. for 10 min., followed by washing with water. However, in comparative examples, the coating operation was conducted as follows. In Experiment No. 101, no polymer scale preventive liquid was applied; in Experipent Nos. 102 and 103, a polymer scale preventive liquid containing either a component (A) or a component (B) was applied; in Experiment No. 104, a polymer scale preventive liquid containing both components (A) and (B) dispersed in water was applied; and in Experiment No. 105 a scale preventive liquid having a pH of more then 3 was applied.

Subsequently, in the polymerization vessel in which the coating had been formed by the coating operation as above, were charged 400 kg of water, 200 kg of vinyl chloride, 250 g of partially saponified polyvinyl alcohol, 25 g of hydroxypropylmethyl cellulose and 75 g of diisopropyl peroxydicarbonate. Then, polymerization was carried out at 57° C. with stirring. After the completion of the polymerization, the amount of polymer scale depositing on the inner wall of the polymerization vessel was measured. Further, the whiteness of the polymer obtained in each Experiment was measured according to the following method.

A hundred parts by weight of a polymer, one part by weight of a stabilizing agent TS-101 (product of Akishima Chemical Co.) and 0.5 part by weight of a stabilizing agent C-100J (product of Katsuta Kako Co.), and 50 parts by weight of a plasticizer DOP were kneaded at 160° C. for 5 min. with a twin roll mill, and then formed into a sheet 1 mm thick. Subsequently, this sheet was placed in a mold measuring 4 cm×4 cm×1.5 cm (thickness), and molded under heating at 160° C. and under the pressure of 65 to 70 kgf/cm$^2$ to prepare a test specimen. This test specimen was measured for lightness L in the Hunter's color difference equation described in JIS Z 8730 (1980). Whiteness was evaluated to become higher with increase in L value.

The L value was determined as follows.

(1) The stimulus value Y of XYZ color system was determined according to the photoelectric tristimulus colorimetry using the standard light C, a photoelectric colorimeter (Color measuring color difference meter Model Z-1001DP, product of Nippon Denshoku Kogyo K.K.) in accordance with JIS Z 8722. As the geometric condition for illumination and receiving of light, the condition d defined in section 4.3.1 of JIS Z 8722 was adopted.

(2) Next, L was calculated based on the equation: L=10Y$^{\frac{1}{2}}$ described in JIS Z 8730(1980). The closer to 100 the L value, the higher whiteness and the lower coloration degree.

The results are given in Table 1.

TABLE 1

| Exp. No. | (A) Organic compound containing —SO$_3$H or —COOH | (B) Compound having an absorption band at 540–750 nm | Weight ratio (A)/(B) | (C) Solvent (weight ratio) | pH adjuster | pH | Amount of polymer scale (g/m$^2$) | L value |
|---|---|---|---|---|---|---|---|---|
| 101* | — | — | — | — | — | — | 1300 | 73 |
| 102* | Sorbic acid | — | 100/0 | Methyl acetate | Sulfuric acid | 1.5 | 1250 | 73 |
| 103* | — | C.I. Solvent Black 3 | 0/100 | " | " | 1.5 | 2 | 67 |
| 104* | Sorbic acid | " | 100/100 | Water/Ethanol (90/10) | " | 1.5 | 1 | 68 |
| 105* | " | " | 100/100 | Methyl acetate | — | 4.0 | 1 | 68 |
| 106 | " | " | 100/100 | " | Sulfuric acid | 1.5 | 0 | 72.5 |
| 107 | Terephthalic acid | C.I. Solvent Blue 2 | 100/200 | Methyl acetate/Methanol (50/50) | Phosphoric acid | 2.0 | 1 | 73 |
| 108 | p-styrene sulfonic acid | C.I. Solvent Black 123 | 100/500 | Methyl acetate/Ethanol (50/50) | Hydrochloric acid | 2.5 | 1 | 71 |
| 109 | Sodium sulfanilate | C.I. Solvent Violet 21 | 100/250 | Methyl acetate | Sulfuric acid | 2.0 | 1 | 72.5 |
| 110 | p-toluen sulfonic acid | C.I. Solvent Green 3 | 100/200 | Ethyl formate | Perchloric acid | 1.0 | 0 | 73 |
| 111 | Glycine hydrochloride | C.I. Solvent Brown 20 | 100/100 | Methyl acetate/Ethanol (90/10) | Phosphoric acid | 2.0 | 1 | 71 |
| 112 | L-ascorbic acid | C.I. Solvent Black 5 | 100/10 | Isopropyl acetate | Sulfuric acid | 1.0 | 0 | 73 |
| 113 | Copper-phthalocyanine tetrasulfonic acid | C.I. Solvent Blue 73 | 100/50 | Methyl acetate/Aceton (80/20) | Nitric acid | 0.5 | 0 | 73 |
| 114 | Urocanic acid | C.I. Solvent Black 23 | 100/20 | Buthyl formate | Phosphoric acid | 0.2 | 0 | 73 |
| 115 | Chlorogenic acid | C.I. Solvent Black 7 | 100/5 | Butyl lactate/Aceton (50/50) | " | 1.5 | 0 | 73 |
| 116 | D-isoascorbic acid | C.I. Solvent Black 123 | 100/200 | Ethyl oxalate/Methanol (50/50) | " | 1.0 | 0 | 73 |
| 117 | Cafeinic acid | C.I. Solvent Blue 36 | 100/50 | Ethyl formate | " | 1.0 | 0 | 73 |
| 118 | Sorbic acid | C.I. Solvent Black 7 | 100/100 | Methyl acetate/Ethanol (40/60) | Perchloric acid | 3.0 | 0 | 72 |
| 119 | " | " | 100/100 | Methyl acetate/Ethanol (40/60) | " | 2.0 | 0 | 72.5 |
| 120 | " | " | 100/100 | Methyl acetate/Ethanol (40/60) | " | 1.0 | 0 | 73 |
| 121 | " | " | 100/100 | Methyl acetate/Ethanol (40/60) | " | 0.5 | 0 | 73 |

EXAMPLE 2

In each of the experiments shown in Table 2, the polymer scale preventive liquid was applied to the inner walls and other parts of a 22 liter-stainless steel polymerization vessel with which a monomer comes into contact, including a stirring shaft and stirring blades, and then dried by heating at 50° C. for 5 hours, followed by washing with water to form a coating.

In the polymerization vessel in which the coating was formed as above, were charged 10 kg of water, 2.5 kg of styrene, 1.0 kg of acrylonitrile, 2.4 kg of an SBR latex, 50 g of an emulsifying agent for production of synthetic rubbers by polymerization manufactured by Harima Kasei Kogyo k.k. (tradename: BANDIS T-100 P), [2.0 g of NaOH, 30 g of t-dodecylmercaptan and 5.0 g of ammonium peroxodisulfate, which were then subjected to polymerization with stirring at 70° C. for 2 hours. After the completion of the polymerization the amount of polymer scale depositing on the inner wall surfaces of the polymerization vessel was measured. Results obtained are given in Table 2.

Nos. of Experiments marked with * indicate comparative examples. That is, in Experiment No 201 no polymer scale preventive liquid was applied; in Experiment Nos. 202 and 203 either a component (A) or a component (B) was applied; in Experiment No.204 a liquid having a pH of more than 3 was applied.

Further, the whiteness (L) of the polymer obtained in each Experiment was measured as follows.

To 1 kg of the polymer latex was added 1 kg of a 2% magnesium sulfate solution to cause aggregation and sedimentation. The sediment was filtered off and washed with hot water at 80°-90° C. twice or three times, and thereafter dried at 45° C. for 20 hours in a vacuum dryer to give a resin. The resin thus obtained was placed in a mold measuring 9 cm×9 cm×0.1 cm (thickness), and molded under heating at 195° C. and under a pressure of 50 to 60 kgf/cm² to prepare a test specimen. This test specimen was measured for lightness L in the same manner as in Example 1.

Results obtained are given in Table 2.

TABLE 2

| | Polymer scale preventive liquid | | | | | | Amount of polymer scale (g/m²) | L value |
|---|---|---|---|---|---|---|---|---|
| Exp. No. | (A) Organic compound containing —SO₃H or —COOH | (B) Compound having an absorption band at 540-750 nm | Weight ratio (A)/(B) | (C) Solvent (weight ratio) | pH adjuster | pH | | |
| 201* | — | — | — | — | — | — | 600 | 85 |
| 202* | p-toluen sulfonic acid | — | 100/0 | Methyl acetate/Ethanol (50/50) | Sulfuric acid | 1.5 | 570 | 85 |
| 203* | — | C.I. Solvent Black 7 | 0/100 | Methyl acetate/Ethanol (50/50) | " | 1.5 | 10 | 77 |
| 204* | p-toluen sulfonic acid | " | 100/200 | Methyl acetate/Ethanol (50/50) | " | 3.5 | 1 | 79 |
| 205 | " | " | 100/200 | Methyl acetate/Ethanol (50/50) | " | 1.5 | 0 | 84.5 |
| 206 | β-naphthoquinone-4-sulfonic acid | C.I. Solvent Violet 21 | 100/100 | Methyl acetate/Ethanol (50/50) | " | 2.5 | 1 | 83 |
| 207 | Potassium propionate | C.I. Solvent Brown 20 | 100/100 | Methyl acetate/Ethanol (50/50) | " | 3.0 | 1 | 83 |
| 208 | Benzoic acid | C.I. Solvent Black 5 | 100/100 | Methyl acetate | Hydrochloric acid | 2.5 | 0 | 83 |
| 209 | Urocanic acid | C.I. Solvent Black 3 | 100/50 | " | Perchloric acid | 0.5 | 0 | 84.5 |
| 210 | " | C.I. Solvent Black 5 | 100/100 | Ethyl formate | " | 0.1 | 0 | 85 |
| 211 | Urocanic acid | C.I. Solvent Black 7 | 100/20 | Methyl lactate/Methanol (50/50) | Perchloric acid | 0.5 | 0 | 85 |
| 212 | " | C.I. Solvent Black 23 | 100/100 | Methyl acetate/1,4-dioxane (90/10) | " | 0.5 | 0 | 84 |
| 213 | Cafeinic acid | C.I. Solvent Blue 2 | 100/150 | Methyl formate | Phosphoric acid | 1.5 | 0 | 84 |
| 214 | " | C.I. Solvent Blue 11 | 100/200 | " | " | 1.5 | 0 | 84 |
| 215 | " | C.I. Solvent Blue 25 | 100/500 | " | " | 2.0 | 0 | 83 |
| 216 | " | C.I. Solvent Blue 35 | 100/500 | " | " | 2.5 | 0 | 83 |
| 217 | L-ascorbic acid | C.I. Solvent Green 3 | 100/100 | Methyl acetate/Methanol (80/20) | Perchloric acid | 2.5 | 0 | 83 |
| 218 | Chlorogenic acid | C.I. Solvent Violet 27 | 100/100 | Methyl acetate/Methanol (80/20) | " | 1.5 | 0 | 84 |
| 219 | D-isoascorbic acid | C.I. Solvent Blue 36 | 100/100 | Methyl acetate/Methanol (80/20) | " | 1.5 | 0 | 84 |
| 220 | Sorbic acid | C.I. Solvent Black 5 | 100/100 | Methyl acetate/Methanol (80/20) | " | 1.0 | 0 | 85 |
| 221 | p-toluen sulfonic acid | C.I. Solvent Black 3 | 100/100 | Methyl acetate/Methanol (80/20) | " | 1.0 | 0 | 85 |

We claim:

1. A method of preventing polymer scale deposition in polymerization of a monomer having an ethylenic double bond in a polymerization vessel, which comprises the step of carrying out said polymerization in a polymerization vessel having a coating formed by applying a liquid consisting essentially of:
   (A) an organic compound containing at least one group selected from the group consisting of a sulfonic group (—SO₃H) and a carboxyl group which each may form a salt, and has a molecular weight of 1,000 or less, and
   (B) a compound which is insoluble in water and has a absorption band in a visible light range of 540 to 750 nm, the compounds (A) and (B) having been dissolved or dispersed in (C) an ester-based organic solvent, liquid having a pH of 3 or less, to the inner wall surfaces of said polymerization vessel and then drying the applied liquid.

2. The method of claim 1, wherein the coating has a coating weight of 0.001 g/m² or more.

3. The method according to claim 1, wherein said coating has been also previously formed on parts of the polymerization vessel with which the monomer comes into contact during polymerization other than its inner wall surfaces.

4. The method according to claim 3, wherein said parts with which the monomer comes into contact comprise at least one member selected from the group consisting of a stirring shaft, stirring blades, baffles, headers, search coils and condensers.

5. The method according to claim 1, wherein said coating has been further previously formed at parts of the recovery system for unreacted monomer with which unreacted monomer comes into contact.

6. The method according to claim 1, wherein the monomer is at least one member selected from the group consisting of vinyl halides; vinyl esters; acrylic acid, methacrylic acid, and esters and salts thereof; maleic acid and fumaric acid, and esters and anhydrides thereof; diene monomers; aromatic vinyl compounds; acrylonitrile; halogenated vinylidenes; and vinyl ethers.

7. The method according to claim 1, wherein said polymerization is carried out as suspension polymerization, emulsion polymerization, solution polymerization, bulk polymerization, or gas phase polymerization.

8. A polymerization vessel of which the inner wall has a coating formed by applying a liquid consisting essentially of:
   (A) an organic compound containing at least one group selected from the group consisting of a sulfonic acid group (—SO₃H) and a carboxyl group which each may form a salt, and has a molecular weight of 1,000 or less, and
   (B) a compound which is insoluble in water and has a absorption band in a visible light range of 540 to 750 nm, the compounds (A) and (B) having been dissolved or dispersed in (C) an ester-based organic solvent, and having a pH of 3 or less, to the inner wall surfaces of said polymerization vessel and then drying the applied liquid.

9. The method of claim 1, wherein said liquid is adjusted to a pH of 3 or less by the addition of an inorganic acid selected from the group consisting of sulfuric acid, hydrochloric acid, phosphoric acid, nitric acid and perchloric acid.

10. The polymerization vessel of claim 8, wherein the pH of said liquid is adjusted to a pH of 3 or less by the addition of an inorganic acid selected from the group consisting of sulfuric acid, hydrochloric acid, phosphoric acid, nitric acid and perchloric acid.

* * * * *